United States Patent [19]
Claflin, Jr.

[11] Patent Number: 5,793,869
[45] Date of Patent: Aug. 11, 1998

[54] METHOD AND APPARATUS FOR ENCODING AND DATA COMPRESSING TEXT INFORMATION

[76] Inventor: Raymond E. Claflin, Jr., 19 Hayden La., Bedford, Mass. 01730-1107

[21] Appl. No.: 731,263

[22] Filed: Oct. 11, 1996

[51] Int. Cl.⁶ .................. H04L 9/00; H04L 9/28
[52] U.S. Cl. .................. 380/49; 380/9; 380/28
[58] Field of Search .................. 380/4, 9, 23, 24, 380/25, 28, 49, 50, 59

[56] References Cited

U.S. PATENT DOCUMENTS

| | | | |
|---|---|---|---|
| 3,786,475 | 1/1974 | Staar . | |
| 4,295,124 | 10/1981 | Roybal . | |
| 4,757,536 | 7/1988 | Szczutkowski et al. | 380/48 |
| 4,853,962 | 8/1989 | Brockman | 380/23 X |
| 4,864,503 | 9/1989 | Tolin . | |
| 4,866,445 | 9/1989 | Valero et al. | 341/106 |
| 4,899,148 | 2/1990 | Sato et al. | 341/65 |
| 4,924,516 | 5/1990 | Bremer et al. | 380/9 X |
| 5,006,849 | 4/1991 | Baarman et al. | 341/95 |
| 5,050,121 | 9/1991 | Vaughan . | |
| 5,093,861 | 3/1992 | Graham | 380/23 |
| 5,113,444 | 5/1992 | Vobach | 380/28 X |
| 5,337,233 | 8/1994 | Hofert et al. . | |
| 5,351,295 | 9/1994 | Perlman et al. | 380/23 |
| 5,374,928 | 12/1994 | Moore et al. | 341/67 |
| 5,440,633 | 8/1995 | Augustine et al. | 380/23 |
| 5,452,358 | 9/1995 | Normile et al. | 380/28 X |
| 5,454,039 | 9/1995 | Coppersmith et al. | 380/28 |
| 5,524,052 | 6/1996 | Augustine et al. | 380/49 |

*Primary Examiner*—Bernarr E. Gregory
*Attorney, Agent, or Firm*—Edwin H. Paul; Jacob N. Erlich

[57] ABSTRACT

A method and apparatus for encoding and compressing a text word of ASCII code by substituting a binary number for said word and sending, storing or recording said binary number. The binary number is retrieved and replaced by the original text word. The binary representation of the word may be placed in a digital real time IRIG, preferably IRIG-B, frame wherein the text word is time stamped so as to record the actual time when the text word was placed in the time frame. The text word may be initially generated by a typist, or by a voice to text machine vocabularies of words to be encoded by replacement with the binary number are formed, and the encoding or encrypting vocabulary may be different from the decoding or decrypting vocabulary. The differences may include foreign languages or combinations of languages. Additional encryption may be obtained by forming a offset in the binary number for the first and the subsequent words used in each vocabulary. Events may be recorded in the IRIG uniform time period by bits indicating an event occurred and by other bit are used to record the actual time within the uniform time period. Several events can be recorded for later reporting by using several contiguous time frames.

13 Claims, 4 Drawing Sheets

| FORMAT | SIGNAL NO. | TIME FRAME RATE | CARRIER FREQUENCY F | SIGNAL BIT RATE ER | RATIO F'ER | MARK INTERVAL NUMBER OF CYCLES | | |
|---|---|---|---|---|---|---|---|---|
| | | | | | | CODE"0" & INDEX | CODE"1" | POSITION IDENTIFIER & REF. |
| A | A130,132 133 | 10 per sec. | 10 kHz | 1 kpps | 10:1 | 2 | 5 | 8 |
| B | B120,122 123 | 1 per sec. | 1 kHz | 100 pps | 10:1 | 2 | 5 | 8 |
| D | D111,112 121,122 | 1 per hr. | 100 Hz 1 kHz | 1 ppm 1 ppm | 6000:1 60000:1 | 1200 12000 | 3000 30000 | 4800 48000 |
| E | E111,112 121,122 | 6 per min. | 100 Hz 1 kHz | 10 pps 10 pps | 10:1 100:1 | 2 20 | 5 50 | 8 80 |
| G | G141,142 | 100 per sec. | 100 kHz | 10 kpps | 10:1 | 2 | 5 | 8 |
| H | H111,112 121,122 | 1 per min. | 100 Hz 1 kHz | 1 pps 1 pps | 100:1 1000:1 | 20 200 | 50 500 | 80 800 |

FIG. 4

METHOD AND APPARATUS FOR ENCODING AND DATA COMPRESSING TEXT INFORMATION

FIELD OF THE INVENTION

The present invention relates generally to the field of recording and transmitting text information, and more specifically to encoding or encrypting and compressing such information. Also, text information which must be correlated to an event or other special occurrence that is time sensitive may be time stamped in a preferred embodiment together with an indication that an event has happened.

BACKGROUND OF THE INVENTION

Encryption or encoding of text data and compression or reduction of the size of a data base continue to be two separate objects of technology, especially digital technology associated with testing, computers and communications. These separate objects are often in conflict with each other and are viewed as being mutually exclusive of each other.

Encryption or encoding to guarantee confidentiality of information is an acknowledged requirement for legal, banking, medical, governmental and for many other transactions that are well known. To satisfy these needs many encoding (herein encoding and encryption are used interchangeably) mechanisms have been developed, many of which have been patented over the years. The inventions run from simple exclusive "oring" to the well known public key/private key combination inventions.

Concurrent with the increasing need for encryption, there has been an ongoing need to store more information in a given volume. Some of these inventions take advantage of the fact that stored data, especially text data, is often duplicated in the stored file. The inventions replace the duplicative data streams with pointers to the first instance of the duplicated data stream, where in the pointer has substantially fewer bits than the data stream itself.

Encryption and storage reduction are at odds with each other, since some encryption techniques suggest adding bits intended to randomize the transmitted signal, and adding bits increases storage needs.

The present invention takes notice that a text word stream is usually digitized into the ASCII code for each letter of the word. The ASCII code (short for USA Standard Code for Information Interchange) contains seven bits that represent alpha-numeric characters and many control characters. An eighth bit is added for parity check, and now exists due to the form factor of a byte (eight bits in a byte) which is a popular form for storing information in computer systems. It should be mentioned in passing that other codes, e.g. a teletype five bit code and a nine bit code, are also is found in the technology. However, it is fair to say that the byte is the prevalent form for digitally storing and/or sending text (including spaces and control characters) characters to distant locations via the array of telecommunications equipment available today. In a typical stream of text information, which may be spoken or typed words, the average word length is about five characters long. Printed text words must be separated from the succeeding word by a space so the average word is actually six characters long. Six characters, each of eight bits, totals forty-eight bits - a fairly large number. A limitation of this "large" number is that transmitting this average word requires enough bandwidth and/or time to accommodate the number of bits. For example, if sixteen bits were sent rather than forty-eight, arguably the transmission path bandwidth could be one-third as large, or alternatively, three times as much information could be sent over the same bandwidth path. Similarly, storage could be one-third as large, or three times as much information could be stored in the same volume. These are significant advantages in the crowded telecommunications and data storage fields.

In some testing operations, voice data (text) or typed data (text) is required to be recorded concurrent with running the test, and this correlation must be maintained when the text is played back. This correlation of time and test is required during the playback of the data so that events associated with the test can e unambiguously correlated with the simultaneously generated text or voiced reactions or observations by those viewing the test. The correlation of the test events and the time, referred to as "time stamping" is a general requirement in many testing areas. One such prior art technique for such time stamping is to record a time signal in parallel with the test on a strip-chart recorder. One channel may record one of the IRIG (see below) time signals while another channel records the actual text data. Reading the two traces on the strip chart together correlates the time stamp to the test. There is a limitation since the recorder does not correlate voiced or text information generated by the observers to the test to a specific test event. This techniques also has the limitation of using two recorder channels, and the time stamp is measured by eye or manually by associating the two signals with each other. A preferred IRIG signal is the IRIG-B signal where, in within a once-per-second timing frame, in an amplitude modulated version (AM), binary coded decimal (BCD) pulses exist on a 1 Kilohertz carrier in an ordered manner defining the day, the hour, the minute, and the second. The IRIG-B signal is broadcast once-per-second with a time resolution of the IRIG-B of one millisecond and with an accuracy of one microsecond. By counting down an internal 10 MHz clock signal which is slaved to the 1 KHz IRIG-B carrier, a resolution of 1 microsecond is obtained. Further, by knowing the cable length from the IRIG-B source to the user, transport lags or delays can be calculated and/or calibrated out to provide time transfer accuracies of 1 microsecond. Other IRIG signals (IRIG-A,C-H) may be used which are broadcast at other time intervals, as is known in the art.

Another limitation of parallel time stamping is that any two separate channels can become disassociated with one another, especially when the data and timing information are digitized and stored in separate memory areas. Since test data and test events can be processed differently from the time signal, a problem can occur where the time correlation may be lost. Processing of test data may take many forms, for example, (i) recording the data in an analog fashion as on the strip chart recorder, (ii) digitizing and recording or storing the data in a computer memory (disk, magnetic tape, RAM, EEROM, etc.), (iii) normalizing or scaling the data, (iv) filtering or separating part of the data signal from the base data signal, (v) transmitting the digital or analog data, (vi) receiving and storing the data, (vii) encrypting or otherwise making the data confidential. In such circumstances there is a chance that the time stamp may become adulterated or lost with reference to test and/or text data.

It is an object of the present invention to provide a data encoding and compression method that preserves confidentiality while reducing storage and transmission requirements.

It is another object of the present invention to allow such text data transmissions to utilize lower bandwidth transmission means than previously used.

It is yet another object to provide unambiguous time stamping of events and text information where the correlation of the events, the text and the time stamp is maintained regardless of the processing performed on the data.

It is a related object to provide event time stamping with a resolution of one microsecond.

SUMMARY OF THE INVENTION

The above objects are met in a method of and apparatus for encoding, processing and decoding digital text data. Herein text data is defined as a binary encoded form that represents the alpha numeric symbols, other symbols and the control and non-printed characters needed, generally, for printed text. A method comprising the steps of: selecting a word for processing, associating said word with a binary number, encoding said word by replacing said word with said binary number, processing the binary number (this processing may take many forms including, but not limited to, transmitting, recording, further encrypting/decrypting and/or storing the binary number), retrieving said processed binary number, and decoding said retrieved binary number by replacing said retrieved binary number with said associated selected word.

The method and apparatus may be extended to include forming and storing a vocabulary of words and associating each word with a binary number, a unique binary number in one preferred embodiment. In this case, in a preferred embodiment, the word is encoded by a look-up table or mapping to replace the word with the binary number and the reverse is performed on the binary number that is received after processing of the binary number.

When the word is digitized in the ASCII form of eight bits, a grouping of five printable characters (a letter, number, punctuation mark or the like that is typically printed) and space (which is an ASCII character) requires forty-eight bits in ASCII. If the word was replaced by a sixteen bit binary coded number which can be regarded as a sixteen bit computer word, there is a savings of 32 bits. The advantage is that the sixteen bit word can be sent in one third the time, or via a transmission channel of one-third the bandwidth, or three times as much other information can be sent in the same time as can be the forty-eight bits for ASCII. In this preferred embodiment the sixteen bits represents about sixty-five thousand words which may be uniquely represented by the sixteen bits (the sixteenth power of two). This vocabulary of 65K text words is sufficient for most text information. However, additional or fewer bits could be used to advantage within the present invention for longer or shorter binary numbers. Of course, fewer bits will designate a smaller vocabulary and more bits a bigger vocabulary. In another preferred embodiment 14 bits are used thus designating a vocabulary of 16,284 (2 to the 14th power), wherein several other bits are used to designate and record the time of these concurrent events.

In another preferred embodiment a binary number can be associated with a group of words during encoding and with a single or a group of words but not necessarily the same word or number of words when decoding within the present invention.

The present invention satisfies the above objects by providing a method and means for time stamping the data in a way that preserves the time relationship without hindering the processing of the data. An event occurring within a time frame may be recorded as having occurred using bits in the frame. Other bits may record the time within the frame that the event occurred.

Another advantage of the present invention is to translate the text into another language by simply having the binary number associated with a given word in one language vocabulary for encoding, and with a similar word meaning a given word in a different language vocabulary for decoding. It is possible to extend this to language processing to include syntax transformation between the languages by known translation techniques. Additional encryption may be obtained by developing an index or offset number that is added to the binary number used for each word and where the offset is subtracted before decoding the binary number into the word from the vocabulary. Other scrambling of offsets may be used to advantage.

Other objects, features and advantages will be apparent from the following detailed description of preferred embodiments thereof taken in conjunction with the accompanying drawings in which:

BRIEF DESCRIPTION OF THE DRAWINGS

FIG. 4 is a table of the IRIG timing signals.

DETAILED DESCRIPTION OF PREFERRED EMBODIMENTS

Figure 1:
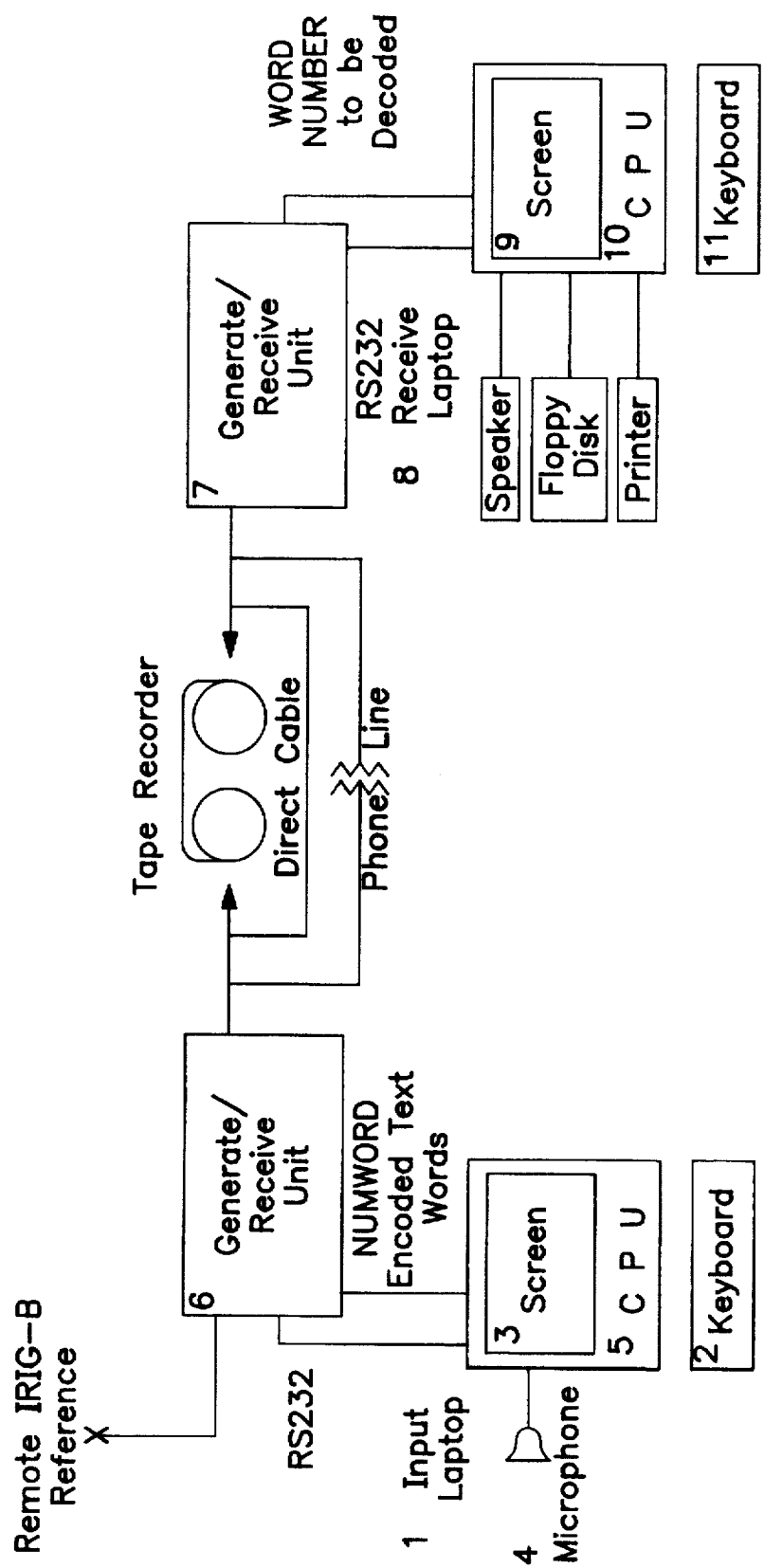
FIG. 1 is a block diagram of a preferred hardware embodiment incorporating the present invention.

FIG. 1 is a block diagram of a preferred embodiment of the present invention. An input laptop computer 1, although virtually any computer with enough memory could be used to advantage in the present invention, has an alpha-numeric keyboard 2, a display 3, and a microphone input 4. The microphone accepts speech and a hardware and software within the laptop converts the speech to digital information encoded in the ASCII format. Text information can be added directly via the keyboard. The keyboard may be the typical typewriter style alpha numeric keyboard or any of the various keyboards found in the art. Within the laptop memory a vocabulary of 65,532 distinct English words is stored and a single 16 bit binary number is associated with each of those words. This database vocabulary can be associated with the 16 bit binary number in many ways that are known in the art. For example, the alphabetical order of the 65k words in the vocabulary may be directly counted in binary to yield a specific 16 bit binary number. Other mapping techniques, or address association techniques, or look-up table techniques, or the like as is known in the art can be employed to advantage in the present invention. Also other languages can be used to advantage and combinations of languages can be used to further encrypt the text itself. For example, a voice message in English may be finally printed out in Spanish when the text is replayed. Other such language combinations can be used including synonyms—one word entered and a synonym later printed on replay. More complex encryption may be accomplished by use of offsets or indexes consistently used for encoding and decoding. For example, a day code may be used as a common index for encoding and decoding via the vocabularies. Other manipulation of the addresses of words within the vocabularies is known to further dissuade eavesdroppers, but, of course, the identical various manipulations must be used for encoding and decoding.

The text words are encoded by replacement with the binary number and the number is sent, say over a RS232 connection or other such mechanism to a generate/receive unit 6. This unit 6 could be housed within the computer in other preferred embodiments. A timing signal is also input to the unit 6. In this preferred embodiment, an IRIG -B reference signal having a user defined data area is employed. The binary number is incorporated into the user defined data bit section of the time signal. The combination time and text encoded signal may be transmitted via telecommunications devices to remote locations, or stored directly onto a magnetic tape or onto a disk or other storage device. When the signal is transmitted the signal (after demodulation from the communication carrier, where demodulation is used in the most broad sense) needs to reconstitute the combined text and time signal existing before transmission whatever the transmitting technique. Once received the signal may be stored at the remote location or the signal may be played directly upon receipt and then stored if so desired.

When played directly from receipt of the transmitted signal a second generate/receive unit 7 synchronizes the IRIG-B signal, finds the user defined data bits and the time stamp bits, retrieves the user bits forming the 16 bit number that was sent, reverses the association procedure used to encode the original text word to find the text word, and plays or prints out or displays that word. Succeeding words are handled similarly as they are received. The receiving computer 8 has a display screen 9, a keyboard 11, a cpu 10, a printer 12, a floppy disk 14 or other such memory device. The encoded word numbers or the decoded text word may be used to reconstitute the phonetics that are fed to a speaker to regenerate the actual spoken word. The time recorded may also be displayed, played or printed. The decoded received words or the number may be stored locally at the receiver on the floppy disk or other memory storage device.

There exists computer hardware, analog to digital converters, timing electronics, and the like, and software to perform the conversions and other necessary tasks required in the preferred embodiments of the present invention. These known techniques, hardware and software, together with the disclosure herein are sufficient for one skilled in the art to build and use the present invention.

The IRIG-B signal may be generated locally or remotely, and the text encoded binary number may be appended to the once per second signal. More than one binary word may be incorporated within the IRIG signal, and the location of the bits and their meaning must be known to the receiving software to retrieve the binary numbers intact. Such protocol and organization and design techniques to accomplish these tasks are well known in the computer and communications fields.

The IRIG signal with the embedded binary numbers may be stored or recorded. During playback the retrieved binary numbers are converted as before into text word. The word may be played or printed or restored as desired.

In addition, a number of alarm or event signals may be encoded into the system. Priority time stamps of events may be input to the system during a run time. These event times may be programmed into the other available user defined bits within the IRIG protocol. These event times may be displayed during playback or direct playing to provide high resolution for special or unusual occurrences that may have occurred during the run. These occurrences are automatically time stamped into the IRIG signal so that review of the occurrence is defined specifically to a particular time without doubt.

In other preferred embodiments bits are designated for the events, and other bits are designated to record the actual time within a uniform time frame that the event occurred. If several events occur, several successive time frames may be needed to record the occurrence and the specific time within the frame that the specific events occurred. If a resolution of one micro second is used , then twenty bits to encode the time within a one second time frame are needed. In this case text or encoded audio data, being less time sensitive might be delayed by a second or a few seconds. This particular embodiment ensures that the event is recorded including the microsecond of the occurrence of the event or of several events.

Another requirement of test runs or other processes is to indicate the start of a message along with the event times for display and for quick tape playback and review.

Figure 2:
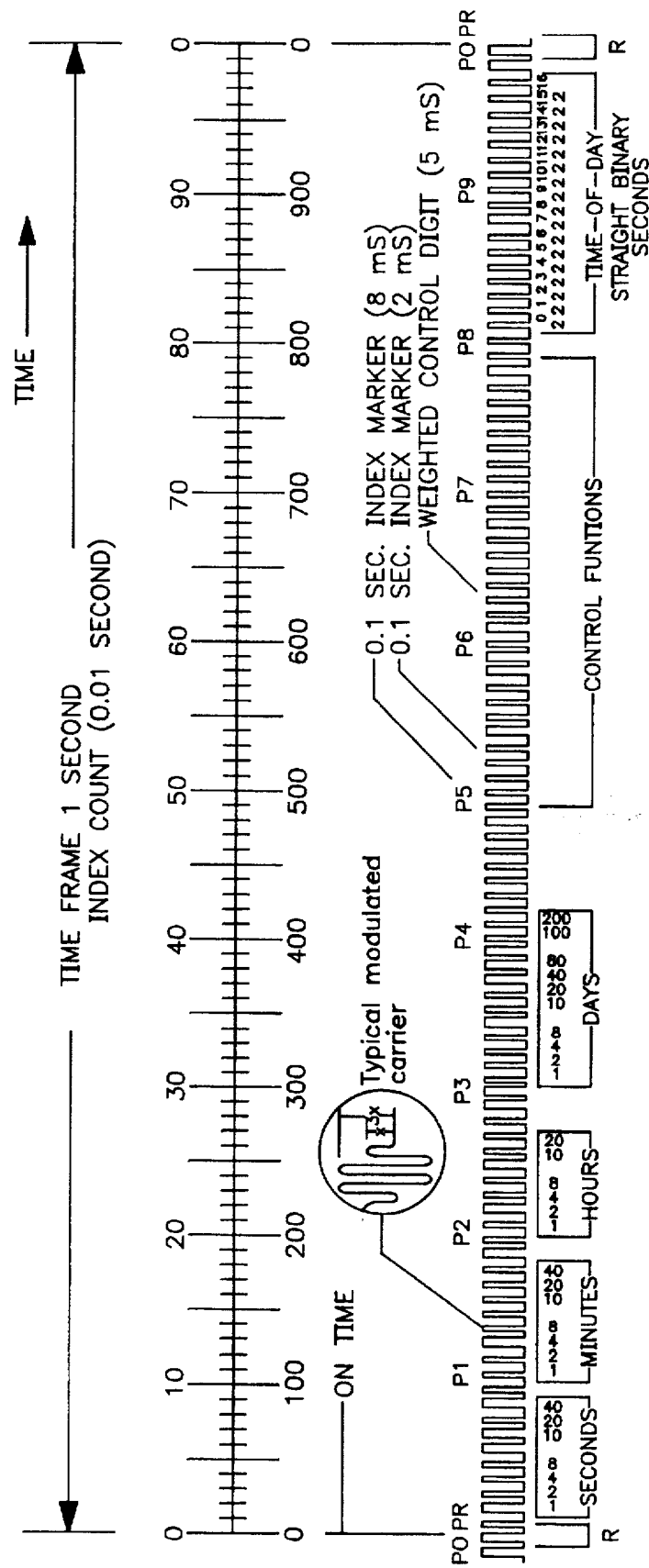
FIG. 2 is a timing chart of a one second frame of the IRIG-B time signal.

FIG. 2 is a representation of the one second digital time frame of the IRIG-B signal. There is a single frame of information each second 18. The first part of the frame contains binary coded decimal time-of-year information in seconds 20 there are seven bits, minutes 22 seven bits, hours 24 six bits, and days 26 ten bits. There are position identifiers every 10 pulse and index markers every 100 pulses. The BCD time code recycles yearly.

Still referring to FIG. 2 the one frame per second starts and ends with ith a reference marker R made up of P0 and PA 21. A binary coded decimal time the year code word of thirty bits is at the start of the frame. There is a straight binary code of seconds (SBS) 30 beginning at index count 80. There is an index marker between the decimal digits in each grouping to provide separation for visual resolution. There is a position indicator bit between the 9th and 10th binary SBS coded bits. The SBS code recycles each 24 hour period. The signal is a modulated 1 kHz carrier with a 1 ms resolution and a dc level shift resolution of 10 ms. There are twenty-seven bits 28 reserved for control information these are essentially user defined and where the present invention, in this preferred embodiment, places the binary encoded text information.

Figure 3:
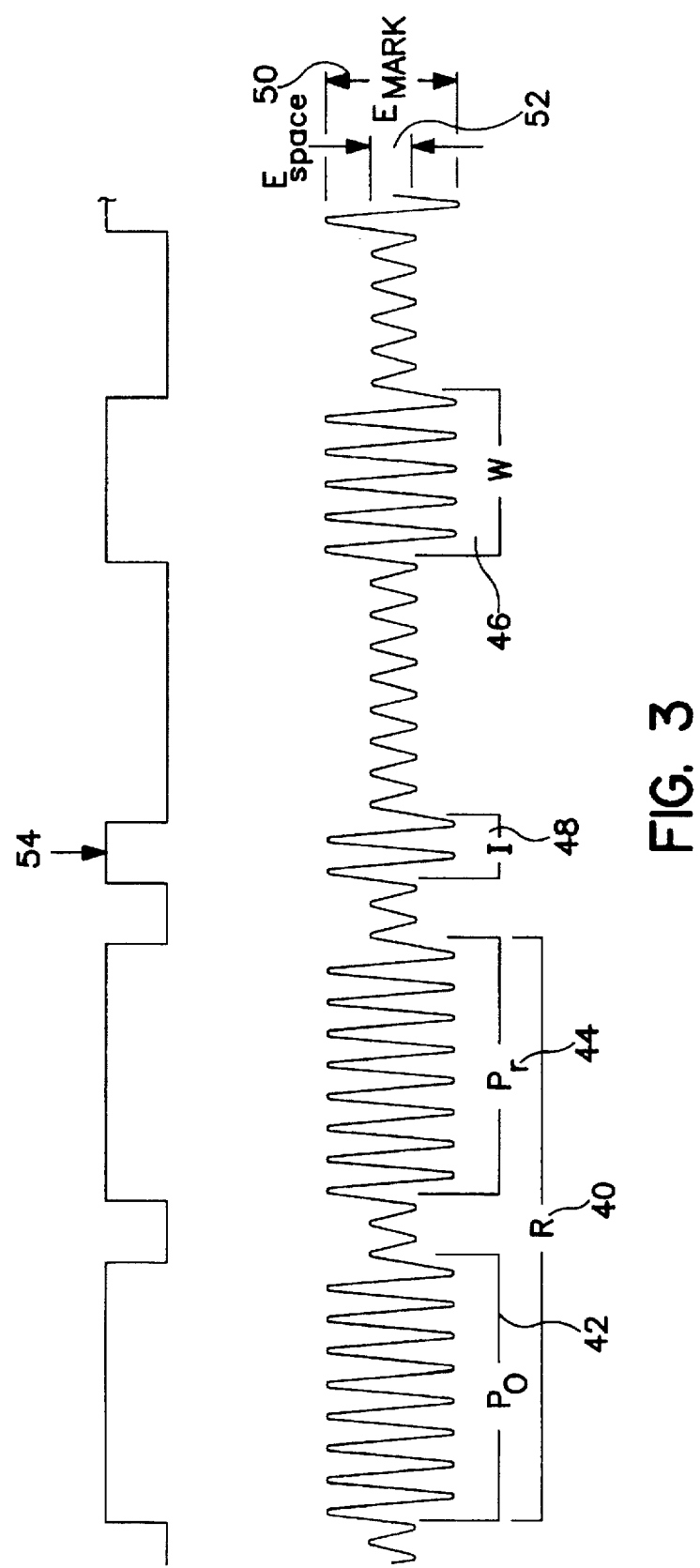
FIG. 3 is a detailed, bit view of an IRIG signal.

FIG. 3 shows a typical dc modulated carrier used in the preferred IRIG-B format. The reference marker R 40 made up of Po 42 and Pr 44. The modulated carrier has signals having a carrier frequency to code bit rate ratio of 10:1. A weighted code digit is shown 46 and an unweighted code digit 48. The higher level signal represents a mark 50 and the lower signal a space 52. The mark to space ratio is from 3:1 to 6:1. The carrier signal frequency is an integral multiple of the modulating signal 54 bit rate, and the positive going zero axis crossing of the carrier is coincident with the leading edge of the modulating signal. Mark and space are terms used in telecommunications transmissions, where the mark/space represents a one/zero of ordinary data when information is being transmitted. Often the beginning of such a transmission is the transition form mark to space to signify the beginning of a data stream.

FIG. 4 shows the other IRIG format A through H signals that could be used to advantage in other preferred embodiments of the present invention.

It will now be apparent to those skilled in the art that other embodiments, improvements, details and uses can be made consistent with the letter and spirit of the foregoing disclosure and within the scope of this patent, which is limited only by the following claims, construed in accordance with the patent law, including the doctrine of equivalents.

What is claimed is:

1. Apparatus for encoding, processing and decoding text data comprising:

means for receiving a word for processing, means for establishing a binary number, where said binary number represents said word, an index, means for providing said binary number with said index to provide an indexed binary number, an encoder that replaces said word with said indexed binary number, means for processing said indexed binary number, means for utilizing said processed indexed binary number, means for reestablishing said binary number by removing said index from said utilized indexed binary number, and a decoder that replaces said reestablished binary number with said represented word.

2. Apparatus as in claim 1 further comprising:

a vocabulary of words, from which said at least one word is processed.

3. Apparatus as in claim 2 further comprising: another vocabulary, wherein said utilized binary number is replaced with words from said another vocabulary.

4. Apparatus in claim 1 further comprising:

a digital frame of bits, a clock providing uniform time periods, means for forming an association between said digital frame of bits and said uniform time periods , means for defining certain bits in said frame of bits to indicate that at least one event has occurred during said digital frame, means for defining other bits as time indicators of the time within said uniform time periods that said at least one event occurred, and means for relating said event with said time indicators to record when during said uniform time periods said event occurred.

5. A method of encoding or encrypting, processing and decoding text data comprising the steps of:

selecting at least one word for processing, establishing a binary number for association with said at least one word, establishing an index, providing said binary number with said index to provide an indexed binary number, encoding said at least one word by replacing said at least one word with said indexed binary number, processing said indexed binary number to provide a processed indexed binary number, utilizing said processed indexed binary number, reestablishing said binary number by removing said index from said utilized processed indexed binary number, and decoding said reestablished binary number by replacing said reestablished binary number with said at least one word.

6. A method as in claim 5 further comprising the step of:

establishing a first vocabulary of words from which said at least one word is processed.

7. The method of claim 6 further comprising the steps of:

establishing a second vocabulary of words for association with said established binary number, wherein the established binary number unique to one word in each vocabulary.

8. The method of claim 6 further comprising the steps of:

representing said text data by the ASCII bit code of letters that form said words, and where the total of the bits of the ASCII code required to represent said words is greater, on average, than the number of bits of the binary number that replaces said words.

9. A method of encoding or encrypting, processing and decoding data, comprising the steps of:

selecting at least one word for processing, establishing a binary number for association with said at least one word, encoding said at least one word by replacing said at least one word with said established binary number, providing digital frames of bits at uniform time periods, inserting said established binary number in a first selected set of bits in a digital frame of said frames of bits at a uniform time period, utilizing a second selected set of bits of a digital frame of bits of said frames of bits as an event indicator to indicate an occurrence of an event in a uniform time period, utilizing a third selected set of bits of a digital frame of bits of said frames of bits as a time of occurrence indicator to indicate the time of occurrence of said event in a uniform time period, establishing a relationship between said event indicator and said time of occurrence indicator to record when during a uniform time period said event occurred, processing said digital frame of bits containing said binary number, processing said digital frame of bits containing said event indicator and said digital frame of bits containing said time of occurrence indicator, sending each said processed digital frame of bits, receiving each said sent digital frame of bits, decoding said established binary number by replacing said established binary number with said selected at least one word, and utilizing said event indicator and said time of occurrence indicator to define events and times of occurrence thereof.

10. The method of claim 9 wherein at least one additional event occurred, further comprising the steps of utilizing a fourth selected set of bits of a digital frame of bits of said frame of bits as an event indicator to indicate the occurrence of said at least one additional event within a uniform time period, and utilizing a fifth selected set of bits of a digital frame of bits of said frames of bits as a time of occurrence indicator to indicate the time of occurrence of said at least one additional event within a uniform time period.

11. The method of claim 10 wherein said uniform time periods are each one second and said number of other bits in said digital frame includes twenty bits that are encoded such that one time intervals are resolved.

12. A method for recording the occurrence of an event and the time of the occurrence of the event, comprising the steps of:

providing a digital frames of bits at uniform time periods, utilizing a first selected set of bits of a digital frame of bits of said frames of bits as an event indicator to indicate an occurrence of an event in a uniform time period, utilizing a second selected set of bits of a digital frame of bits of said frames of bits as a time of occurrence indicator to indicate the time of occurrence of said event in a uniform time period, recording said event and said time of occurrence of the event in said first and second selected set of bits.

13. The method of claim 12 wherein several events occur and the recording of the events and the time of each event is recorded over a sequence of uniform time periods.

* * * * *